United States Patent
Nagai et al.

(10) Patent No.: US 12,466,145 B2
(45) Date of Patent: Nov. 11, 2025

(54) PRODUCTION METHOD FOR PRODUCING OPTICAL FIBER RIBBON

(71) Applicant: SWCC Corporation, Kawasaki (JP)

(72) Inventors: Takeshiro Nagai, Kawasaki (JP); Takehiko Yamamoto, Kawasaki (JP); Hiroyuki Tomonari, Kawasaki (JP)

(73) Assignee: SWCC Corporation, Kawasaki (JP)

( * ) Notice: Subject to any disclaimer, the term of this patent is extended or adjusted under 35 U.S.C. 154(b) by 0 days.

(21) Appl. No.: 18/574,451

(22) PCT Filed: Aug. 29, 2022

(86) PCT No.: PCT/JP2022/032457
§ 371 (c)(1),
(2) Date: Dec. 27, 2023

(87) PCT Pub. No.: WO2024/047714
PCT Pub. Date: Mar. 7, 2024

(65) Prior Publication Data
US 2025/0100240 A1  Mar. 27, 2025

(51) Int. Cl.
*B29D 11/00* (2006.01)
*G02B 6/44* (2006.01)

(52) U.S. Cl.
CPC .. *B29D 11/00663* (2013.01); *B29D 11/00875* (2013.01); *G02B 6/448* (2013.01); *G02B 6/4482* (2013.01)

(58) Field of Classification Search
CPC ........ B29D 11/00663; B29D 11/00875; G02B 6/448; G02B 6/4482
See application file for complete search history.

(56) References Cited

U.S. PATENT DOCUMENTS 6,381,390 B1 * 4/2002 Hutton ................ G02B 6/4482
385/114
2016/0223774 A1  8/2016 Bennett et al.

FOREIGN PATENT DOCUMENTS

JP  H01150105 A   6/1989
JP  H02149904 U  12/1990
(Continued)

OTHER PUBLICATIONS

PCT International Search Report and Written Opinion for International Patent Application No. PCT/JP2022/032457, dated Oct. 4, 2022, 9pp.

*Primary Examiner* — Mathieu D Vargot
(74) *Attorney, Agent, or Firm* — The Roy Gross Law Firm, LLC; Roy D. Gross

(57) ABSTRACT

An object of the present invention is to provide a production method for producing an optical fiber ribbon that has an identification mark for identification, in which optical transmission loss is unlikely to be caused. A production method for producing an optical fiber cable for achieving the above objective includes: curing a photocurable resin by irradiating the photocurable resin with light, the photocurable resin being disposed to couple together a plurality of single-core coated optical fibers arranged in parallel; and forming a plurality of identification marks on the photocurable resin cured, the forming being performed by applying ink by an ink-jet method, in which the forming the plurality of identification marks is performed in a state in which a temperature of the photocurable resin is lower than or equal to 37.3° C.

2 Claims, 3 Drawing Sheets

(56) References Cited

FOREIGN PATENT DOCUMENTS

| | | | |
|---|---|---|---|
| JP | 2012247464 | A | 12/2012 |
| JP | 2015108756 | A | 6/2015 |

* cited by examiner

PRODUCTION METHOD FOR PRODUCING OPTICAL FIBER RIBBON

CROSS REFERENCE TO RELATED APPLICATIONS

This application is a National Phase of PCT Patent Application No. PCT/JP2022/032457 having International filing date of Aug. 29, 2022, the contents of which are incorporated herein by reference in their entirety.

TECHNICAL FIELD

The present invention relates to a production method for producing an optical fiber ribbon.

BACKGROUND ART

In recent years, data traffic has increased dramatically due to popularization of Internet of Things (IoT), full-scale 5G commercialization, autonomous driving of automobiles, and so on, and worldwide demand has been increasing for the maintenance and construction of high-speed and high-capacity optical fiber communication networks that support such traffic.

In particular, information communication cables in European and American countries are often laid in underground ducts, and are physically constrained by the laying space in the ducts. In order to economically realize the maintenance and construction of high-speed and high-capacity optical fiber communication networks in the European and American countries, it is important to accommodate a greater number of single-core coated optical fibers in existing ducts.

When the cables are branched or a specific single-core coated optical fiber is drawn into a building from the cables, it is necessary to select the specific single-core coated optical fiber from among a large number of single-core coated optical fibers. Conventionally, identifying the single-core coated optical fibers has been often performed based on the colors of the single-core coated optical fibers. In addition, the specific single-core coated optical fiber has also been identified based on accommodation positions of the single-core coated optical fibers using a plurality of accommodation parts disposed in the cables. Furthermore, forming identification marks on individual single-core coated optical fibers by an ink-jet method or the like has also been performed (for example, Patent Literature (hereinafter, referred to as "PTL") 1).

CITATION LIST

Patent Literature

PTL 1
Japanese Patent Application Laid-Open No. 2012-247464

SUMMARY OF INVENTION

Technical Problem

However, when the single-core coated optical fibers are accommodated in the cables at high density as described above, the colors of the single-core coated optical fibers and/or the patterns of the identification marks are finite. Further, identification of the single-core coated optical fibers also has had a problem that, when the identification marks are complicated, it is difficult to distinguish them. Meanwhile, when a plurality of accommodation parts are disposed in each of the cables, it is difficult to increase the number of single-core coated optical fibers that can be accommodated in the cable.

In recent years, an "optical fiber ribbon" in which a plurality of single-core coated optical fibers are coupled to one another has been put into practical use. Therefore, it is conceivable to form an identification mark on such an optical fiber ribbon to enhance identifiability for each optical fiber ribbon. When the identification mark is formed on the optical fiber ribbon, the number of patterns for necessary identification marks can be significantly reduced as compared with a case where an identification mark is formed on an individual single-core coated optical fiber. Further, according to the aforementioned method, identification of the patterns is facilitated.

However, intensive studies by the present inventors have revealed that when an identification mark is formed by an ink-jet method or the like immediately after the formation of the optical fiber ribbon, optical transmission loss may increase. In particular, the present inventors have found that the temperature of the optical fiber ribbon during ink application and/or drying for forming the identification mark is very important, and have arrived at the present invention.

A main object of the present invention is to provide a production method for producing an optical fiber ribbon capable of suppressing optical transmission loss even when an identification mark is formed.

Solution to Problem

In order to solve the above problem, according to one aspect of the present invention, a production method for producing an optical fiber ribbon is provided, the production method including:
  curing a photocurable resin by irradiating the photocurable resin with light, the photocurable resin being disposed to couple together a plurality of single-core coated optical fibers arranged in parallel; and
  forming a plurality of identification marks on the photocurable resin cured, the forming being performed by applying ink by an ink-jet method, in which
  the forming the plurality of identification marks is performed in a state in which a temperature of the photocurable resin is lower than or equal to 37.3° C.

Advantageous Effects of Invention

According to the production method for producing an optical fiber ribbon of the present invention, it is possible to suppress optical transmission loss even when an identification mark is formed.

DESCRIPTION OF EMBODIMENTS

Hereinafter, a production method for producing an optical fiber ribbon according to a preferred embodiment of the present invention will be described. With respect to the description "to" indicating a numerical range, the lower limit value and the upper limit value are included in the numerical range in the present specification.

[Optical Fiber Ribbon]

To begin with, a structure of an optical fiber ribbon produced by the production method of a present embodiment will be described.

Figure 1:
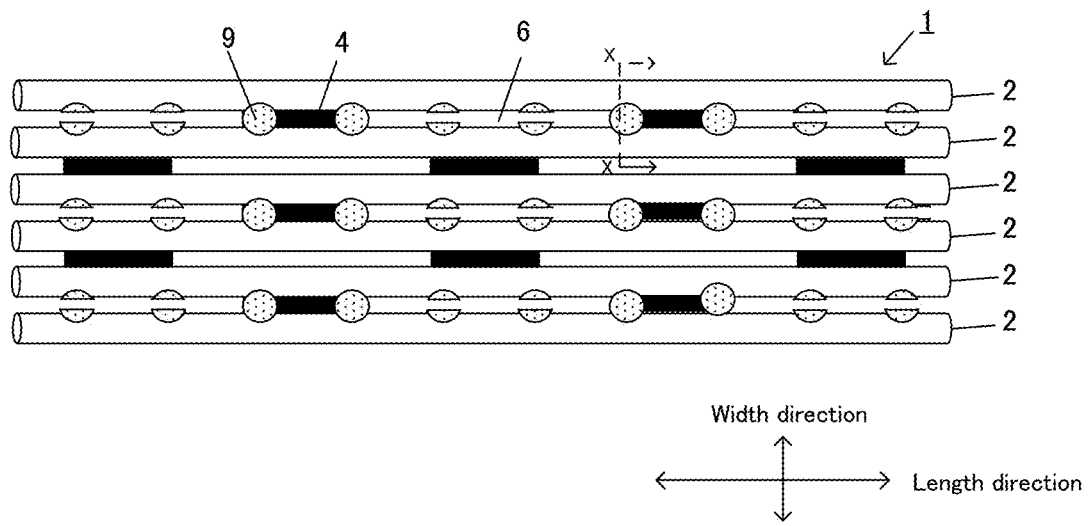
FIG. 1 is a plan view illustrating a schematic configuration of an optical fiber ribbon produced by a production method for producing an optical fiber ribbon according to an embodiment of the present invention.
Figure 2:
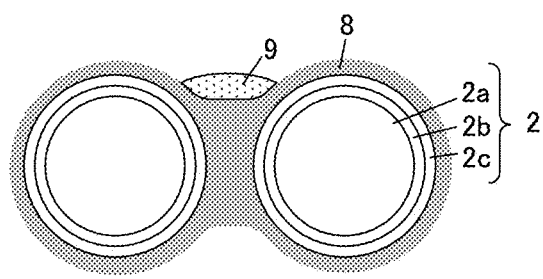
FIG. 2 is a cross-sectional view taken along line X-X in FIG. 1.

FIG. 1 is a schematic plan view of optical fiber ribbon 1 produced in the present embodiment. FIG. 2 is a cross-sectional view taken along line X-X in FIG. 1.

As illustrated in FIG. 1, optical fiber ribbon 1 includes a plurality of single-core coated optical fibers (hereinafter, also simply referred to as "optical fibers") 2. The number of optical fibers 2 included in one optical fiber ribbon 1 is appropriately selected according to the application of optical fiber ribbon 1, and is usually about 4 to 12.

As illustrated in FIG. 2, each of optical fibers 2 has a structure in which optical fiber strand 2a is covered with primary coating layer 2b and secondary coating layer 2c successively, and the optical fiber strand, primary coating layer, and secondary coating layer are the same as an optical fiber strand, first coating layer, and second coating layer of a known optical fiber. A coloring layer (not illustrated) may be further disposed on the surface of each optical fiber 2. It is preferable that optical fibers 2 be colored, and optical fibers 2 in optical fiber ribbon 1 be different in color from each other. The different colors allow identification of a plurality of optical fibers 2 in one optical fiber ribbon 1.

Further, tape layer 8 is disposed around the plurality of optical fibers 2, and in the present embodiment, adjacent optical fibers 2 are intermittently coupled to one another by tape layer 8. In this specification, a region in which tape layer 8 is disposed between adjacent optical fibers 2 is referred to as coupling portion 4, and a region in which tape layer 8 is not disposed between adjacent optical fibers 2 is referred to as separating portion 6. In optical fiber ribbon 1 of the present embodiment, coupling portions 4 and separating portions 6 are alternately disposed between adjacent optical fibers 2. It is preferable that separating portions 6 be disposed such that adjacent separating portions 6 partially overlap each other when optical fiber ribbon 1 is observed in the width direction.

In addition, identification mark 9 is a mark for identifying optical fiber ribbon 1. In the present embodiment, as illustrated in FIG. 1, identification marks 9 are disposed on optical fiber ribbon 1 entirely in the length direction, but regions in which a plurality of identification marks 9 are disposed and regions in which no identification mark 9 is disposed may be alternately disposed.

Further, identification marks 9 only need to be disposed with a certain regularity so that optical fiber ribbon 1 can be recognized. In the present embodiment, although a plurality of substantially circular identification marks 9 with the same size and the same color are disposed in the present embodiment, identification marks 9 with different shapes, different sizes, and/or different colors may be disposed in optical fiber ribbon 1. In addition, the shape of identification mark 9 is not limited to a circular shape, and the identification mark may be, for example, a numeral, a character, or the like. Further, in the present embodiment, the plurality of identification marks 9 are disposed at substantially equal intervals, but optical fiber ribbon 1 may be provided with identifiability by arranging the plurality of identification marks 9 at different intervals.

Identification marks 9 may be disposed on optical fibers 2, on coupling portions 4, or on both of them. Further, in the present embodiment, identification marks 9 are disposed astride two adjacent optical fibers 2, but the present invention is not limited to the present embodiment. Identification marks 9 disposed astride two optical fibers 2 may be continuous or may be divided by separating portion 6. Further, in the present embodiment, a plurality of optical fibers 2 are independent for each core, and coupling portions 4 and separating portions 6 are located between optical fibers 2, but the structure of optical fiber ribbon 1 is not limited to this structure. For example, a plurality of (e.g., two) optical fibers 2 constitute one unit, and coupling portions 4 and separating portions 6 may be disposed to connect together these units. Further, in the present embodiment, identification marks 9 are disposed on only one surface of optical fiber ribbon 1, but identification marks 9 may be disposed on both surfaces of optical fiber ribbon 1.

Note that it is preferable that identification marks 9 be a solidified product (cured product) of various inks as described in a production method described later, and in the present embodiment, is a cured product of ink containing a solvent. The average thickness of the identification marks is not particularly limited, but is usually preferably 3 μm or less, and more preferably 1 μm or greater and 3 μm or less.

[Production Apparatus and Production Method for Producing Optical Fiber Ribbon]

In the production method for producing an optical fiber ribbon according to the present embodiment, a step of curing a photocurable resin by irradiating, with light, the photocurable resin disposed to couple together a plurality of single-core coated optical fibers arranged in parallel (hereinafter, also referred to as "optical fiber coupling step"), and a step of forming a plurality of identification marks on the cured photocurable resin by applying ink by an ink-jet method (hereinafter, also referred to as "identification mark forming step") are performed. In the present embodiment, these steps are performed continuously without performing any step of winding coupled bodies of the optical fiber ribbon onto a bobbin during the optical fiber coupling step and the identification mark forming step.

Here, an apparatus for performing the optical fiber coupling step and the identification mark forming step of the present embodiment is not particularly limited, but these steps can be performed by, for example, the following production apparatus.

(1) Production Apparatus for Producing Optical Fiber Ribbon

Figure 3:
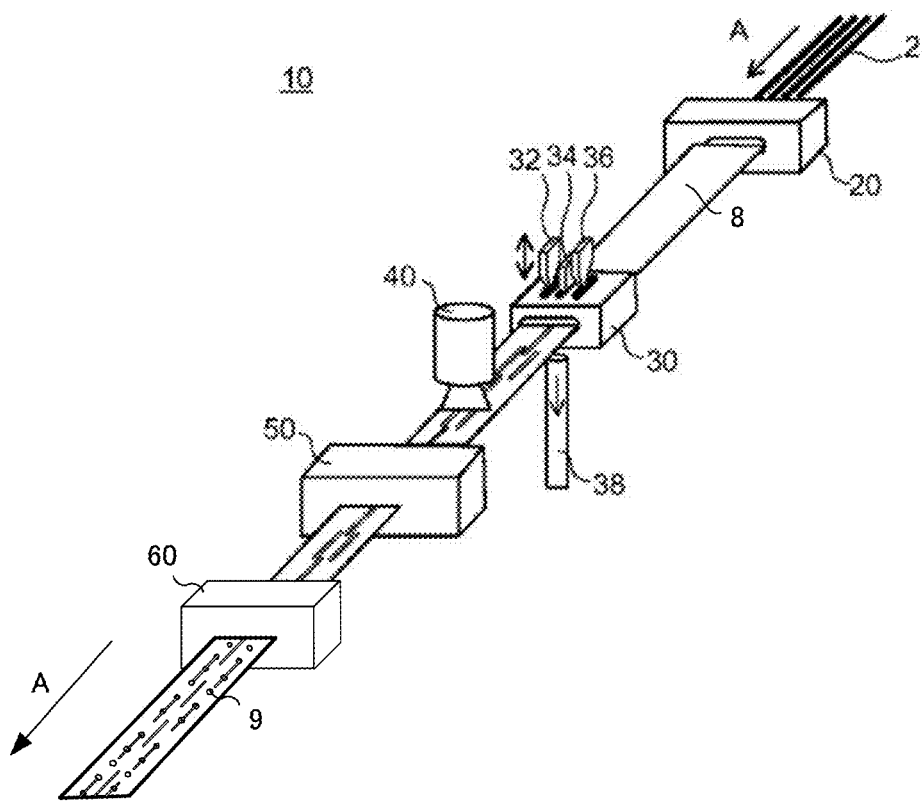
FIG. 3 is a perspective view illustrating an example of a production apparatus for producing the optical fiber ribbon.

FIG. 3 is a diagram illustrating a schematic configuration of production apparatus 10 for producing the optical fiber ribbon.

As illustrated in FIG. 3, production apparatus 10 for producing the optical fiber ribbon is configured such that, mainly, tape die 20, separation die 30, two light irradiation apparatuses 40 and 50, and ink application apparatus 60 are installed in this order along conveyance direction A of above-described optical fibers 2, and optical fibers 2 pass through these dice and the apparatuses in the order presented.

Tape die 20 is a general-purpose die for collectively coating the periphery of the plurality of optical fibers 2 with a photocurable resin, and is configured to apply, in the form of tape, the uncured photocurable resin to the plurality of optical fibers 2 passing through the tape die, so as to form tape layer 8.

Separation die 30 is provided with a plurality of (three in FIG. 4) separation needles 32, 34, and 36 which are vertically movable. Separation needles 32, 34, and 36 are disposed between and above optical fibers 2, and middle separation needle 34 and opposite separation needles 32 and 36 are alternately raised and lowered with respect to the uncured photocurable resin. Separating portions 6 and coupling portions 4 are thus intermittently formed.

Resin suction apparatus 38 for sucking excess photocurable resin is installed in separation die 30. Resin suction apparatus 38 is configured to suck the excess photocurable resin blocked by the downward movement of separation needles 32, 34, and 36.

Upstream light irradiation apparatus 40 irradiates the uncured photocurable resin with light, and is configured to semi-cure the photocurable resin. The term "semi-curing" means a state in which the resin is not fully cured, that is, a state in which the resin is partially cross-linked by light energy.

Downstream light irradiation apparatus 50 further irradiates the semi-cured photocurable resin with light, and is configured to fully cure the photocurable resin. The term "fully curing" means a state in which the resin is cured to a state of being fully or nearly fully cured, that is, a state in which the resin is cross-linked to a state of being fully or nearly fully cross-linked by light energy.

The outputs of upstream light irradiation apparatus 40 and downstream light irradiation apparatus 50 are adjusted such that the integral irradiation amount of upstream light irradiation apparatus 40 is smaller and the integral irradiation amount of downstream light irradiation apparatus 50 is larger.

Ink application apparatus 60 is disposed further on the downstream side of downstream light irradiation apparatus 50, and is an apparatus for forming identification marks 9 on the photocurable resin (tape layer 8). Ink application apparatus 60 includes a nozzle for applying ink, a tank for storing the ink, a control section for controlling the timing of applying the ink, and the like. In the present embodiment, the nozzle is an ink-jet nozzle, but the type of ink application apparatus 60 is not limited to the ink-jet application apparatus.

The production apparatus may further include a measurement section for measuring the temperature of the photocurable resin, a temperature adjustment apparatus (for example, a cooling apparatus) for adjusting the temperature of the photocurable resin, and/or the like between downstream light irradiation apparatus 50 and ink application apparatus 60. Further, a curing apparatus for drying (curing) the ink, a winding apparatus for winding the optical fiber ribbon on a bobbin, and/or the like may be further provided downstream of ink application apparatus 60.

Note that, in the above description, the apparatus for performing the optical fiber coupling step described later and the apparatus for performing the identification mark forming step as the same apparatus, but these apparatuses may be separate apparatuses.

(2) Production Method for Producing Optical Fiber Ribbon

Each step of the production method for producing the optical fiber ribbon of the present embodiment will be described in detail.

(2.1) Optical Fiber Coupling Step

In the optical fiber coupling step, an uncured photocurable resin is applied to a plurality of optical fibers 2 in the form of a tape by tape die 20 in a state in which the plurality of optical fibers 2 are conveyed along conveyance direction A. Tape layer 8 is thus formed.

Then, separation needles 32, 34, and 36 of separation die 30 are moved up and down with respect to tape layer 8, to remove tape layer 8 partially to form separating portions 6 (and coupling portions 4) described above. In addition, resin suction apparatus 38 sucks the excess photocurable resin blocked by the downward movement of separation needles 32, 34, and 36.

Next, light irradiation apparatus 40 irradiates tape layer 8 with light to semi-cure the uncured photocurable resin. Finally, light irradiation apparatus 50 further irradiates the semi-cured photocurable resin with light to completely cure the semi-cured photocurable resin. Note that, at upstream light irradiation apparatus 40 and downstream light irradiation apparatus 50, the integral irradiation amounts of the apparatuses are adjusted such that the integral irradiation amount of upstream light irradiation apparatus 40 is smaller and the integrated irradiation amount of downstream light irradiation apparatus 50 is larger.

(2.2) Identification Mark Forming Step

In the identification mark forming step, for example, as shown in FIG. 3, ink is applied from ink application apparatus 60 at a predefined position (in FIG. 3, the ink is applied to straddle two optical fibers 2) on the photocurable resin cured by the above-described optical fiber coupling step. Then, the applied ink is dried (cured) to form identification marks 9.

In the present embodiment, the ink is applied and dried (cured) in a state where the temperature of the photocurable resin is lower than or equal to 37.3° C. The "temperature of the photocurable resin" in the present specification refers to the surface temperature of the photocurable resin. The aforementioned temperature may be a temperature measured by a contact thermometer or a temperature measured by a non-contact thermometer.

Although the optical transmission loss is likely to occur when the identification mark forming step is performed without temperature control successively to the optical fiber coupling step, it has been clarified that the optical transmission loss can be suppressed by controlling the temperature for performing the identification mark forming step as described above. Although the reason for this suppression is not clear, this is considered to be because when the temperature of the photocurable resin exceeds 37.3° C. at the time of performing the identification mark forming step, components in the ink greatly inhibit crosslinking (gelation) of the photocurable resin at a position of printing, causing the Young's modulus of the photocurable resin to differ from one position to another, and microbends are thus caused in optical fibers 2. In contrast to this, when the temperature of the photocurable resin at the time of performing the identification mark forming step is lower than or equal to 37.3° C., the influence on the photocurable resin is reduced, and optical transmission loss is thus unlikely to occur in optical fiber ribbon 1.

The temperature of the photocurable resin at the time of performing the identification mark forming step is more preferably 15° C. or higher and 32.7° C. or lower, and even more preferably 25° C. or lower from the viewpoint of reliably suppressing the occurrence of optical transmission loss.

In addition, as a method for adjusting the temperature of the photocurable resin at the time of performing the identification mark forming step, there are methods for disposing ink application apparatus 60 at a position away from light irradiation apparatuses 40 and 50 and disposing the temperature adjustment apparatus (cooling apparatus) between light irradiation apparatus 50 and ink application apparatus 60 on the downstream side in above-described production apparatus 10. However, the method for adjusting the temperature of the photocurable resin is not limited to these methods.

Here, the ink for forming identification marks 9 is not particularly limited, and may be, for example, an ink containing a colorant (pigment and/or dye), a binder resin (for example, vinyl chloride, vinyl alcohol, vinyl acetate copolymer, and the like), and a solvent.

When the ink for forming the identification marks contains a ketone-based solvent or an alcohol-based solvent, the above-described transmission loss is particularly likely to occur. On the other hand, in the case where the identification mark forming step is performed in the temperature range described above, the effect of a ketone-based solvent or an alcohol-based solvent is unlikely to occur even when the ink contains the ketone-based solvent or the alcohol-based solvent. Therefore, the ink of the present embodiment may include these solvents.

After the application of the ink, the ink may be naturally dried, or the drying or curing of the ink may be accelerated by, for example, air.

Further, after the identification mark is formed, a step of winding the optical fiber ribbon on the bobbin by a winding apparatus or the like may be further performed.

EXAMPLES

Example 1-3

(1) Optical Fiber Coupling Step

A single-core coated optical fiber having an outer diameter of 250 μm was prepared by applying a primary coating made of a urethane acrylate-based photocurable resin having a Young's modulus of about 5 MPa at 23° C. and a secondary coating made of a urethane acrylate-based photocurable resin having a Young's modulus of about 700 MPa at 23° C. to a quartz glass-based SM optical fiber having an outer diameter of 125 μm.

Thereafter, by using the same production apparatus as in FIG. 3 in a state where 12 single-core coated optical fibers were arranged, tape layer 8 was formed by application of a urethane acrylate-based photocurable resin.

Then, separation needles 32, 34, and 36 of separation die 30 were moved up and down with respect to tape layer 8, to remove tape layer 8 partially to form separating portions 6 (and coupling portions 4) described above. Further, tape layer 8 was irradiated by light irradiation apparatus 40 with light to semi-cure the uncured photocurable resin. Finally, the semi-cured photocurable resin was further irradiated by light irradiation apparatus 50 with light to completely cure the semi-cured photocurable resin.

(2) Identification Mark Forming Step

While measuring the temperature of the cured photocurable resin surface, the ink for forming the identification marks was applied (dropped) and allowed to dry naturally when the temperature is 25° C., 32.7° C., and 37.3° C. Ink containing methyl ethyl ketone (ketone-based solvent) was used.

Figure 4:
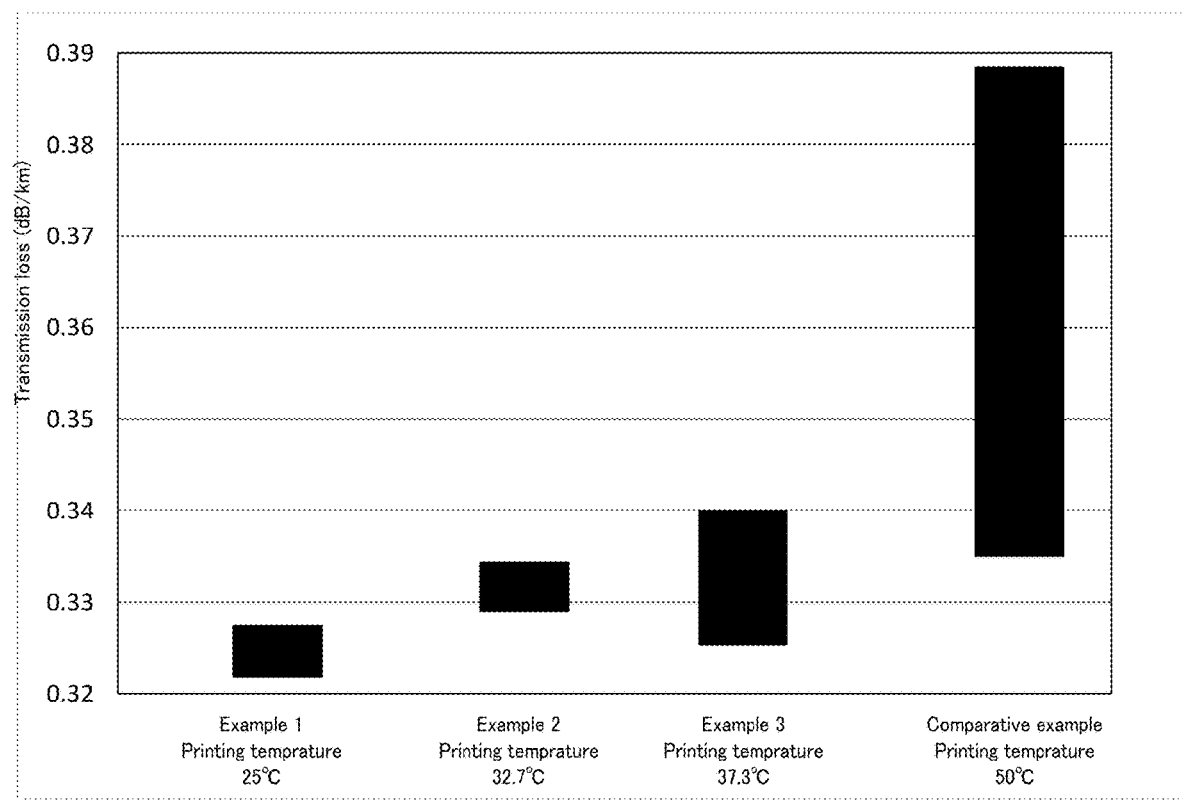
FIG. 4 is a graph illustrating optical transmission losses of optical fiber ribbons manufactured in Examples and a comparative example.

With respect to the optical fiber ribbon, the optical transmission loss at a wavelength of 1310 nm was measured for each single-core coated optical fiber in accordance with IEC60793-1-40 for transmission loss. FIG. 4 illustrates the measurement results. In FIG. 4, black bars represent values between the upper limit values and the lower limit values of the optical transmission loss.

Comparative Example

An optical fiber ribbon was manufactured by the same production method as in Examples 1 to 3 and the optical transmission loss at a wavelength of 1310 nm was measured under the same measurement evaluation criteria as in Examples 1 to 3, except that the above (2) identification mark forming step (ink application) was performed when the temperature of the photocurable resin surface was 50° C. FIG. 4 illustrates the measurement result.

Evaluation

When the optical transmission loss at a wavelength of 1310 nm is less than or equal to 0.34 dB/km, a product is determined as a non-defective product. As illustrated in FIG. 4, when the identification marks are formed in a state where the temperature of the photocurable resin is lower than or equal to 37.3° C., the optical transmission loss is suppressed to 0.34 dB/km or less (Examples 1 to 3). On the other hand, when the identification mark was formed at the temperature of the photocurable resin of about 50° C., the optical transmission loss was large (Comparative Example).

REFERENCE SIGNS LIST

1 Optical fiber ribbon
2 Single-core coated optical fiber
2a Optical fiber strand
2b Primary coating layer
2c Secondary coating layer
4 Coupling portion
6 Separating portion
8 Tape layer
10 Production apparatus for producing optical fiber ribbon
20 Tape die
30 Separation die
32, 34, 36 Separation needle
38 Resin suction apparatus
40 (Upstream) light irradiation apparatus
50 (Downstream) light irradiation apparatus
60 Ink application apparatus

The invention claimed is:

1. A production method for producing an optical fiber ribbon, using a production apparatus containing one or more light irradiation apparatus, a temperature adjustment device, and an ink application apparatus installed in this order along a conveyance direction of single-core coated optical fibers, wherein the method comprises:
curing a photocurable resin by irradiating the photocurable resin with light from the light irradiation apparatuses, the photocurable resin being disposed to couple together a plurality of single-core coated optical fibers arranged in parallel;
adjusting a temperature of the cured photocurable resin by the temperature adjustment device while measuring the temperature; and
forming a plurality of identification marks on the cured photocurable resin, the forming being performed by applying ink by an ink-jet method using the ink application apparatus; wherein the forming the plurality of identification marks is performed in a state in which the temperature of the cured photocurable resin is lower than or equal to 37.3° C.

2. The production method for producing an optical fiber ribbon according to claim 1, wherein the ink contains a ketone-based solvent and/or an alcohol-based solvent.

* * * * *